L. CONNOR.
POT STILT.
APPLICATION FILED FEB. 20, 1908.
906,200.
Patented Dec. 8, 1908.
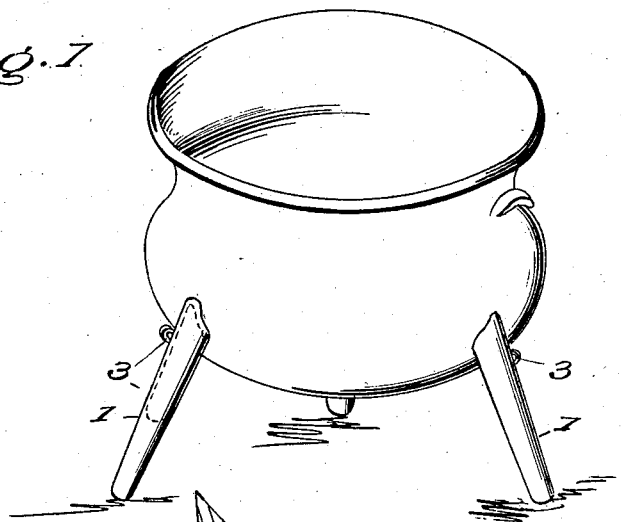
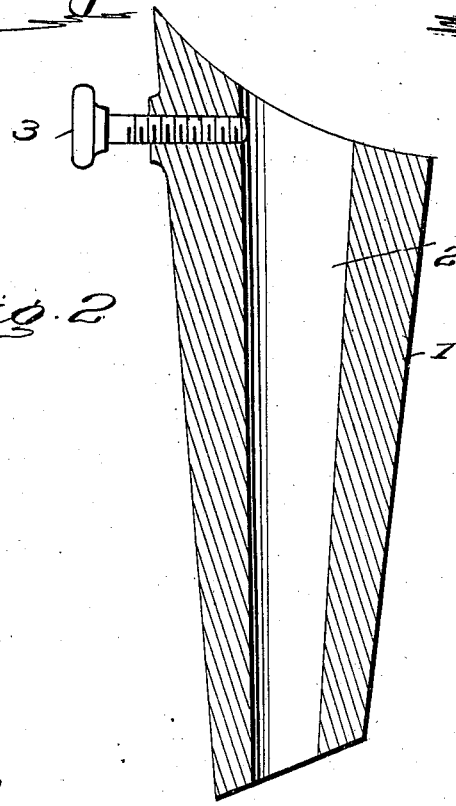
Witnesses
Inventor
L. Connor
By
Attorneys

UNITED STATES PATENT OFFICE.

LAVIGA CONNOR, OF OWDOMS, SOUTH CAROLINA.

POT-STILT.

No. 906,200. Specification of Letters Patent. Patented Dec. 8, 1908.

Application filed February 20, 1908. Serial No. 416,890.

*To all whom it may concern:*

Be it known that I, LAVIGA CONNOR, citizen of the United States, residing at Owdoms, in the county of Saluda and State of South Carolina, have invented certain new and useful Improvements in Pot-Stilts, of which the following is a specification.

This invention contemplates certain new and useful improvements in attachments for pots of that type which are supported upon legs, and the object of the invention is an improved stilt which may be readily applied to the leg of the pot to elevate the latter without propping the pot upon a brick in the customary way, and which serves to protect the leg from injury by preventing it from coming in contact with the fire.

With this and other objects in view, which will more fully appear as the description proceeds, the invention consists in certain constructions and arrangements of parts that I shall hereinafter fully describe and claim.

For a full understanding of the invention and the merits thereof, reference is to be had to the following description and accompanying drawing, in which:

Figure 1 is a perspective view of a pot showing my improved stilt applied thereto. Fig. 2 is a longitudinal sectional view of the stilt.

Corresponding and like parts are referred to in the following description and indicated in all the views of the drawing by the same reference characters.

My improved device comprises a body portion 1, which is preferably constructed of metal or other suitable material or substance capable of withstanding heat, and which is preferably round and tapers towards its lower end as shown. This body portion is formed with a longitudinal leg-receiving socket 2, which communicates with the upper end of the body portion and tapers inwardly therefrom.

One of my improved stilts is designed to be applied to each leg *a* of the pot A, said legs being received in the respective tapered sockets 2, and being wedged therein so as to firmly support the pot in an elevated position. The upper end of the body portion is preferably curved to fit the contour of the pot and to thus rest snugly thereagainst.

If desired, the leg receiving socket 2 of the stilt may be extended throughout the length of the body portion 1 so as to communicate with the lower end thereof and thus adapt the stilt for use with legs of different sizes and lengths, and also to permit the socket to be easily cleaned in case any rubbish should become lodged therein.

It is to be understood that in order to more securely hold the leg of the pot in the socket 2, the body portion may be formed near its upper end with a transverse threaded aperture, and a set screw 3 is mounted in such aperture and is adapted to bear against the leg for this purpose.

From the above description, in connection with the accompanying drawing, it will be seen that I have provided a simple, durable and efficient construction of stilt which may be readily applied to a pot, and the use of which is obvious.

It is to be particularly noted that the upper end of the body portion of the pot stilt is beveled and is preferably slightly concaved so as to bear against the pot and conform to the contour thereof to prevent the stilt from turning upon the pot leg, while the other end of the body portion is oppositely beveled to rest evenly upon the supporting surface.

Having thus described the invention, what I claim as new is:

A pot stilt comprising a body portion formed with a longitudinally tapering socket extending entirely therethrough and with a transversely threaded aperture communicating with the socket near the upper end thereof, the socket being designed to receive the leg of a pot, a set screw mounted in the aperture and adapted to bear against the leg to retain the same in the socket, the upper end of the body portion being beveled and concave to bear against the pot and prevent the stilt from turning upon the leg, and the lower end of the body portion being oppositely beveled, as and for the purpose specified.

In testimony whereof I affix my signature in presence of two witnesses.

LAVIGA CONNOR. [L. S.]

Witnesses:
W. S. CROUCH,
M. T. PITTS.